United States Patent [19]

[11] 4,108,361

Krause

[45] Aug. 22, 1978

[54] UNIVERSAL MARK SENSE BETTING TERMINAL SYSTEM AND METHOD

[76] Inventor: Stephen R. Krause, 3607 Anton Farms Rd., Baltimore, Md. 21208

[21] Appl. No.: 729,807

[22] Filed: Oct. 12, 1976

[51] Int. Cl.[2] .......................... G06K 7/00; G06K 3/00

[52] U.S. Cl. .................................... 235/375; 364/412

[58] Field of Search ................ 179/2 DP; 235/61.7 B, 235/61.9 R, 61.9 A, 61.11 E, 61.11 R; 340/149 A, 152 R; 250/568; 364/410, 411, 412

[56] References Cited

U.S. PATENT DOCUMENTS

| | | | |
|---|---|---|---|
| 3,035,764 | 5/1962 | Beman | 235/61.9 R |
| 3,124,674 | 3/1964 | Edwards | 364/412 |
| 3,327,292 | 6/1967 | Eriksson | 364/412 |
| 3,578,953 | 5/1971 | Milford | 235/61.11 R |
| 3,617,638 | 11/1971 | Jochimsen | 179/2 DP |
| 3,697,698 | 10/1972 | Oswald | 235/61.9 R |
| 3,711,833 | 1/1973 | Starky | 235/61.7 B |
| 3,786,234 | 1/1974 | Trent | 235/61.9 A |
| 3,833,885 | 9/1974 | Gentile | 340/152 R |
| 3,845,280 | 10/1974 | Dillon | 235/61.11 R |
| 3,852,571 | 12/1974 | Hall | 235/61.9 A |
| 3,914,309 | 10/1975 | Swensen | 235/61.11 E |

*Primary Examiner*—Robert M. Kilgore

*Attorney, Agent, or Firm*—Wilkinson, Mawhinney & Theibault

[57] ABSTRACT

The invention comprises apparatus and a method for accepting, validating and recording betting information from slips. The micro-computer processes the information for various games, ROM memories being provided for the game sub-routine and RAM memories for storing slip betting data and game formats or portions thereof used in processing. The invention may comprise a terminal for correcting and transferring the betting information to a remote computer. The bets are accepted by an agent through keyboard means which also initiate printout of information stored on tape cassette means, journal printout, printout of totals and acceptance or rejection of bet. The slips are read by an optical reader and a calendar clock supplies time information for inclusion in the betting information stored. Display means enable the agent to supervise the processing and the capacity of the terminal may be increased by adding further memory chips.

The invention is explained in connection with the games of Boloteca and Esportiva with the principles being applicable to other mark-sense betting slips.

13 Claims, 14 Drawing Figures

FIG. 4
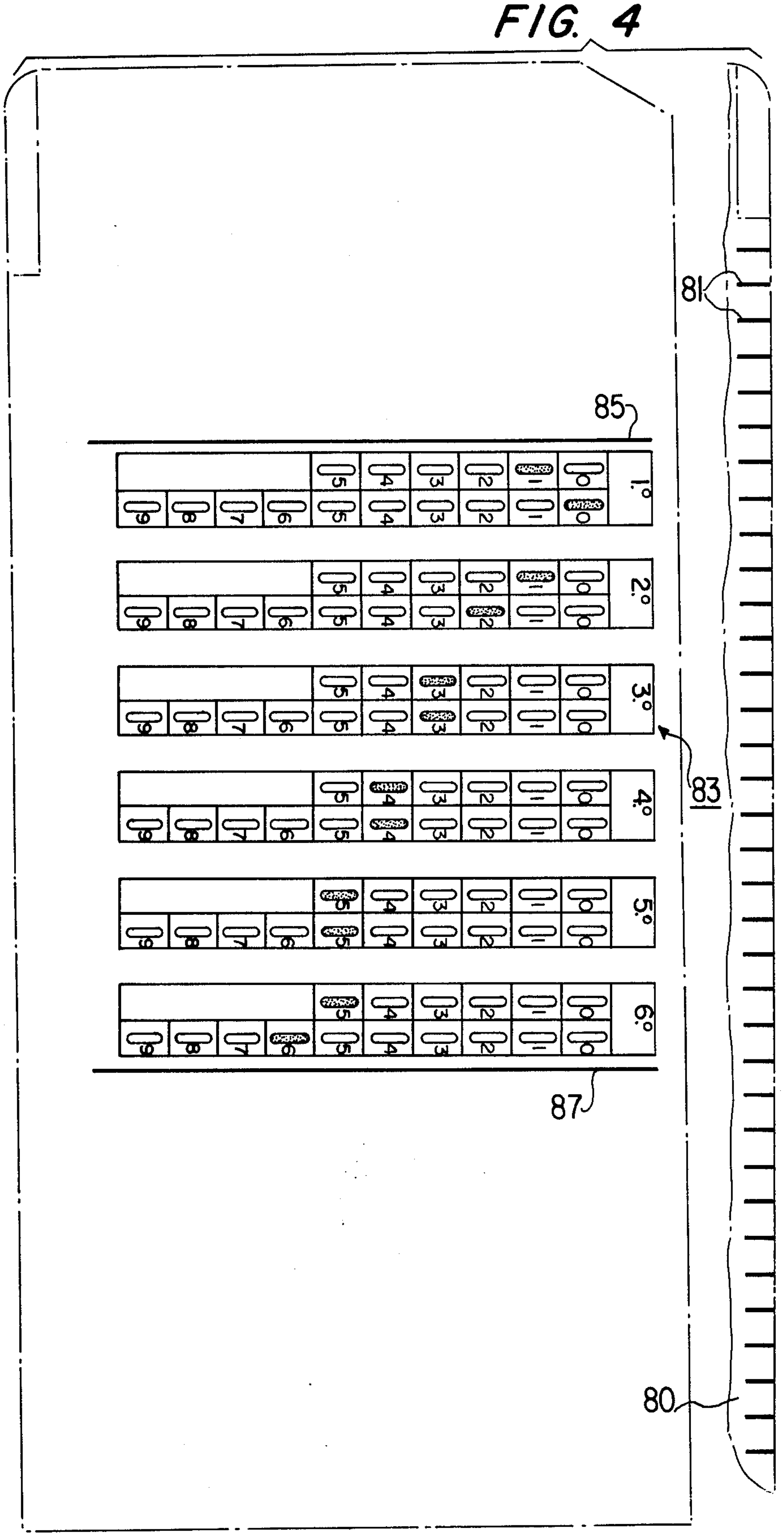
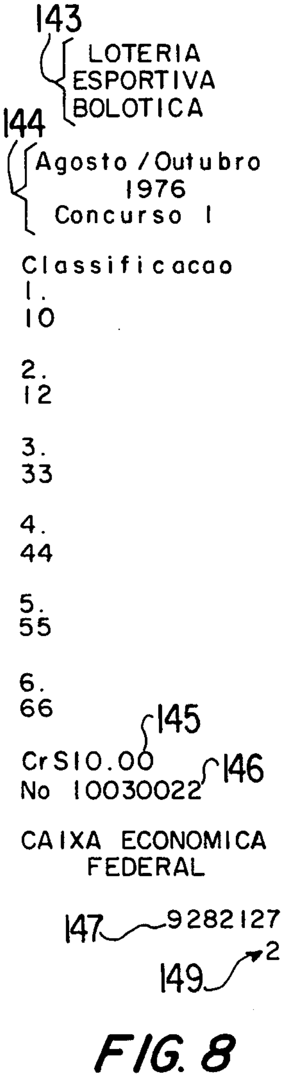
FIG. 8

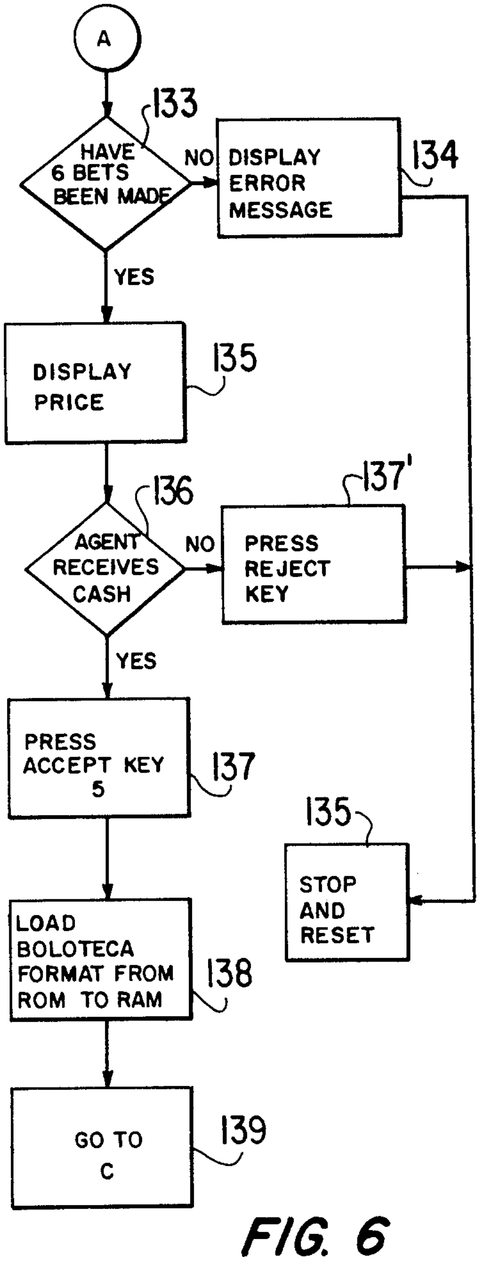
FIG. 6
FIG. 10
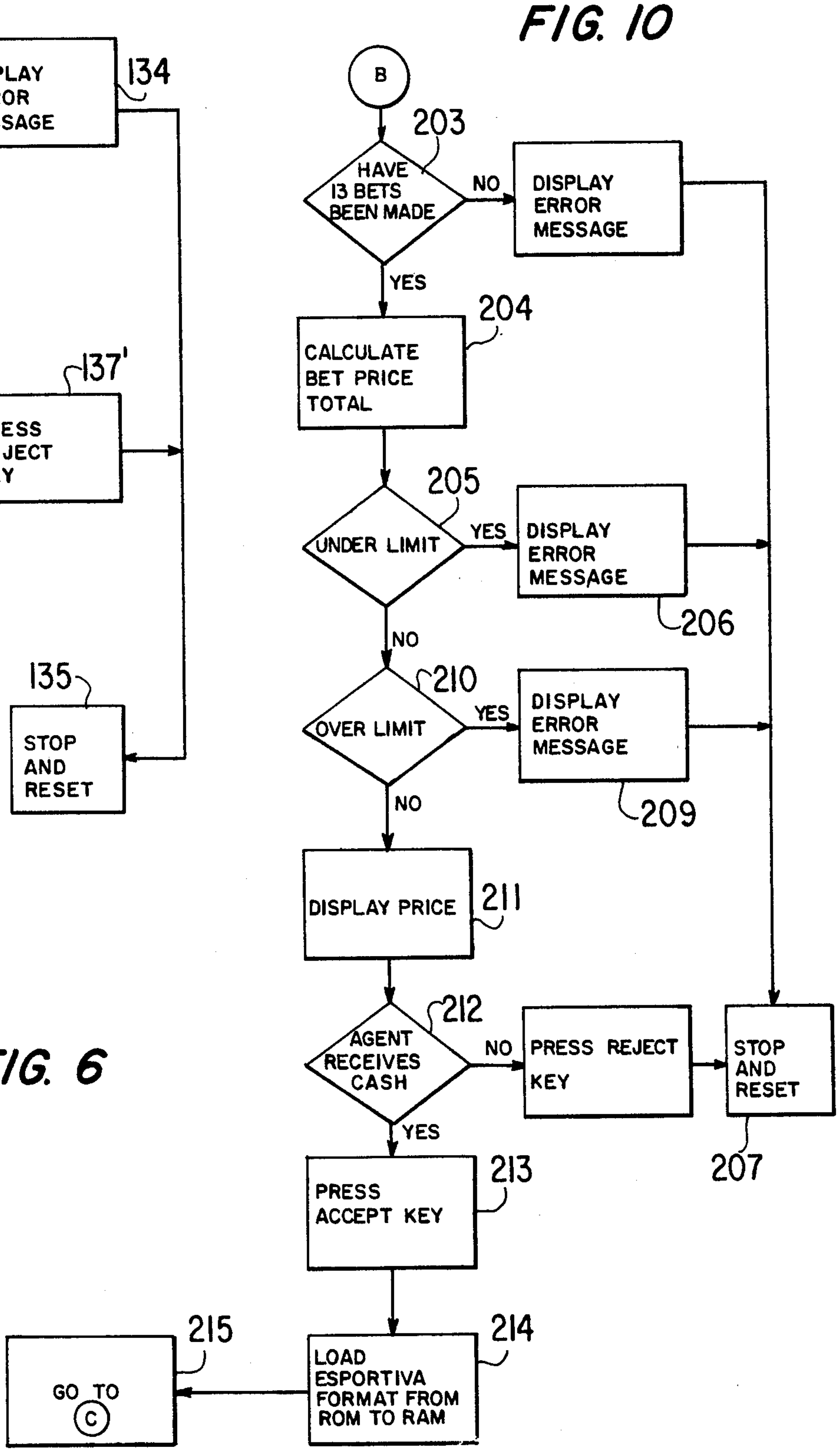

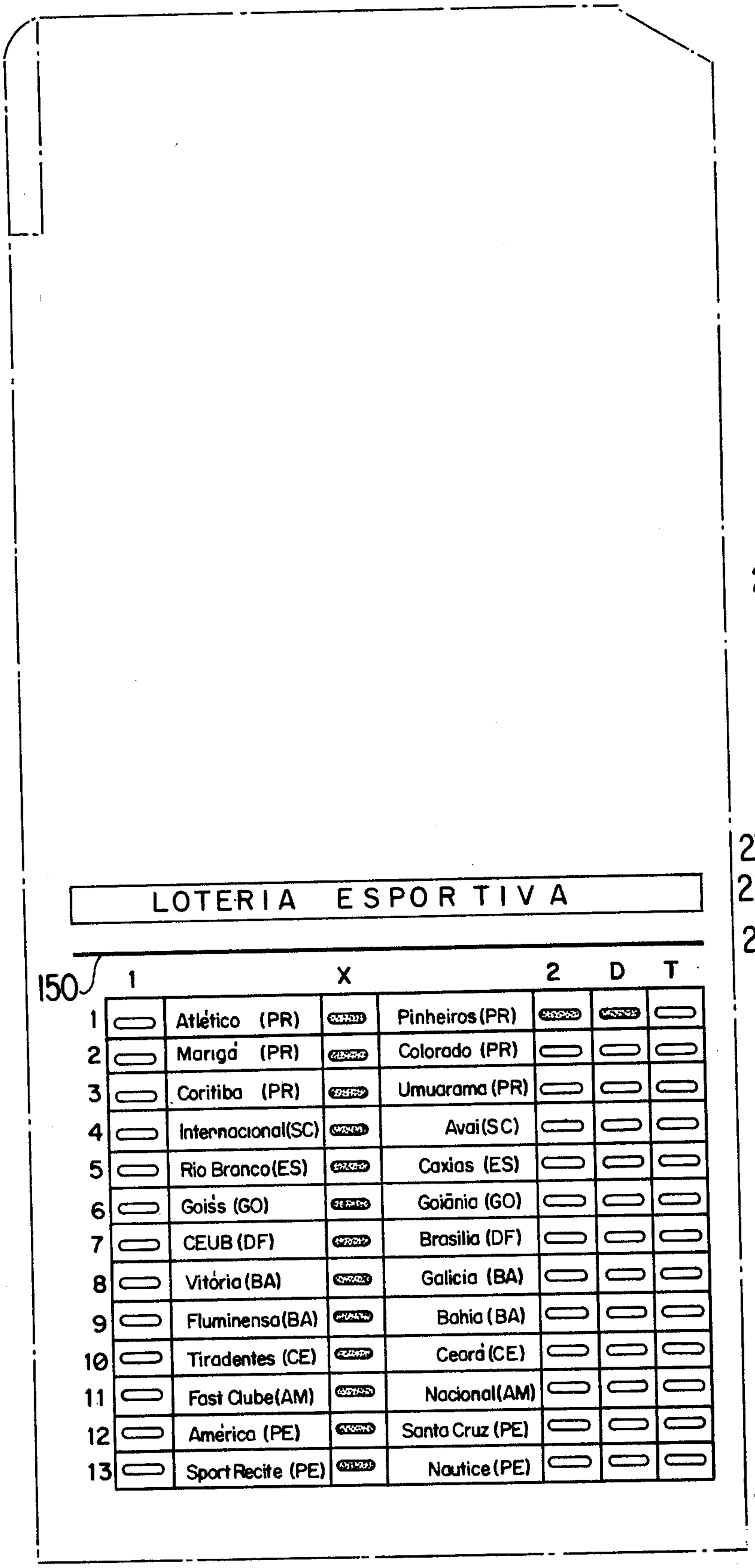
FIG. 9
FIG. 11
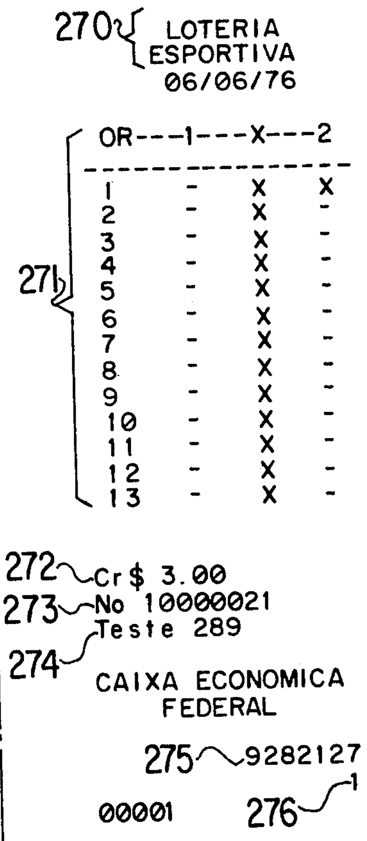

UNIVERSAL MARK SENSE BETTING TERMINAL SYSTEM AND METHOD

The invention relates to an apparatus and method for accepting, validating and recording betting information contained on mark-sense betting slips filled out by the bettor. The system is designed to accept lottery numbers tickets, sports wagering tickets and other games that can be placed on a standard 12 column wide tab type card or slip. The length of a standard tab card or slip being 12 columns wide by 80 columns long.

Many countries throughout the world operate government sponsored number games, lotto games and sports event wagering pools. Betting slips for these games are available to the public and are filled out by marking designated parts of the betting slip. The completed betting slip is brought to an agent or other designated location where the slip is validated on a manual basis. The customer then pays for the bets made and is given a receipt by the agent.

The agent in turn, brings all the accumulated betting slips to a central bank or other clearing house once a week or at other designated intervals and settles his cash account.

This method of handling betting slips is time consuming, error prone and costly due to the number of times the betting slip must be handled and calculated.

The present invention does away with manual calculation, validation by agent and manual data entry of the bets. The system is universal insofar as its ability to be programmed to accept, check and validate any type of betting arrangement that can be printed on a standard mark-sense betting card, as noted. Two examples of types of games the system can accept are shown below. The Lottery Esportiva game is a sports pool wagering game in which the bettor must pick the results of 13 football-type games that will be held during the course of one week. The rules of the game provide that the bettor select results for all 13 games. In addition, the bettor may make double or triple bets for a given game up to a prescribed limit. In effect, the bettor has seven possible combinations for each game, i.e. He may select:

1. team 1, 2. team 2, 3. a tie, 4. team 1 and a tie for a double, 5. team 2 and a tie, 6. team 1 and team 2, or 7. team 1, team 2 and a tie for a triple.

The rules of this game require that the bettor make a minimum of 12 single bets and one double bet for a minimum price of three crusaros. Additional double and triple bets can be made up to a maximum of 162,000 crusaros. The bets are calculated by exponentiating 2 to the number of doubles selected times 3 exponentiated to the number of triples selected and multiplying that figure times 1, 50 crusaros to give the total due. This game is laid out on a 12 by 35 line matrix form.

The second example is the Boloteca game which for a set 10,000 crusaros bet permits the player to select six teams in the order 1 through 6 that he thinks will wind up as the top six teams, in order, during the season. The back of the slip lists 54 teams from which the bettor makes six selections and marks these selections by darkening the appropriate segment of the form corresponding to the selected team. This card is also laid out on a 12 by 35 line matrix form.

The mark-sense reader uses infra-red light sources and photo-transistors to sense the presence of information on a card. The wavelength of the light emitted is not in the visible spectrum. The reader senses light transmitted through the card. A heavy, dark mark made by a soft graphite pencil will attenuate the light latch. If no mark or hole is encountered, the data latch is not set. The back of the betting slip contains 35 strobe marks. The latched data is not cleared until a strobe occurs. The strobe which follows the data does two things: it signals that data is stable and is ready to be read and it clears the data latches. On the back of the card on the left side is the card sense channel that consists of an unbroken black line running down the side of the card. The card sense channel detects if a card is present and controls the readers transport motor.

All text printed on the card is in red ink that cannot be picked up by the readers photodiodes. The mark-sense reader reads one line at a time of data and transfers this data to a micro-computer and into a RAM (random access memory) memory matrix.

The system is comprised of a mark-sense card reader, a readout display, a micro-computer based around an 8080 chip and associated memory and digital logic, a printer, a tape cassette transport, a calendar clock, and an agent keyboard. In operation, a bettor fills in his betting slip and presents it to the agent who in turn feeds the slip into the mark-sense reader. Data identifying the type of game and the bets are fed from the reader through the micro-computer and into a matrix memory that is controlled by the computer program. The memory matrix is dimensioned to configure with each field on the 12 by 35 line slip. A mark on any segment of the slip will cause a "1" to appear in the associated memory matrix.

Associated with each game or slip form is a ROM (read only memory) containing the program associated with that game. The slip is encoded with one black line imprinted on data line 7 of the Boloteca game and another at line 25. The Esportiva Pool slip is encoded with a black line at data line 20.

After the betting slip is read, the data is loaded into the 12 by 35 data matrix located in the micro computer systems RAM in which 420 bits of this matrix correspond to the 420 possible data locations on each of the game slips. A mark made on the betting slip will cause a binary "1" to appear in the associated RAM matrix. No mark or a blank on the betting slip will cause a binary "0" to appear in the RAM. The RAM is then accessed by the CPU (central processing unit) under program control to determine which game slip has been read. If the bet slip does not correspond to a valid game, the program causes an error message to be the output to the Display indicating an invalid betting slip. If the slip is valid, the main program branches to the program ROM associated with the particular game. The CPU under program control checks all bets and calculates the amount of money owed by accessing data from the RAM's 12 by 35 matrix representing bets or marks made on the ticket and read by the optical reader. If less than the required number of bets are made, more than the required number of bets are made, or if the slip has been improperly marked, the program sub-routine causes the appropriate error message to be the output to the Display.

If all bets are valid, the total amount owed is the output to the display and the program stops.

Upon payment of the amount due for the wagers made, the agent presses the "accept" key on his keyboard and the bet is recorded onto a data file on the tape cassette transport. The data file will contain digital information converted from the 12 by 35 RAM matrix, representing bets made on the betting slip. The file contains 45 bytes of data listed as follows:

File No.
Receipt Serial No.
Date and time of transaction
13 digits of code representing the bets made (12 digits for the Boloteca)
Amount wagered
Machine No.

At the time the bet is accepted by the agent and his accept key is pressed, the CPU, under program control, interrogates the calendar/clock through the I/O peripheral interface and stores the data representing month, day, hour and minute. This data is then transferred to the tape file. After the bet is recorded, the program directs the CPU to print out a receipt of the transaction using the format contained in the program ROM, representing the type of transaction or betting slip used. This receipt contains information relating to the bets placed, the amount of the bets, the serial number of the ticket, the date and time of the transaction, and the file on which the bet was recorded. The ACU (arithmetic logic unit) of the CPU generates a sequential serial number for both the tape file and ticket serial number by incrementing 1 to each storage register, after each transaction. The ACU also calculates the price of the bets and keeps a running total of each type of betting transaction and a cash total for each game. The agent presses his total key to obtain a visual and printed readout of each games total for either cash or number of transactions.

At the end of the betting period, the agent removes the tape cassette for pick up and processing at a central computing area. An alternate feature of the micro-computer will permit the agent to transmit the entire contents of the tape cassette to the central computer over a standard voice grade dial-up telephone line using the I/O communications interface. This is a Universal Synchronous/Asynchronous Receiver/Transmitter (USART) chip designed for data communications in micro-computer systems. The USART is used as a peripheral device and is programmed by the CPU to operate using virtually any seral data transmission technique presently in use. The USART accepts data characters from the CPU in parallel format and then converts them into a continuous serial data stream for transmission.

As new games and betting schemes, such as, numbers type lotteries and Lotto games are developed, the programming necessary for reading, recording and validating these new games and associated betting slips can be added in the form of a pre-programed plug-in ROM to the already existing universal mark-sense betting terminal. These additional ROM's will contain all the necessary sub-programming to direct the operation of the peripheral I/O units and CPU.

The invention will be better understood from a reading of the following detailed description thereof when taken in light of the accompanying drawings wherein:

FIG. 4 shows the pertinent portions of a Boloteca betting slip with timing marks from the reverse side shown to the right;

FIG. 6 shows the sequence for the Boloteca game;

FIG. 8 depicts the data stored for the file of betting slip of FIG. 4, as printed on a bettor receipt;

FIG. 9 illustrates a portion of the Esportiva ticket;

FIG. 10 shows the sequence for the Esportiva ticket;

FIG. 11 shows the data stored in the file for the Esportiva ticket of FIG. 9, as printed on a bettor receipt;

Figure 1:
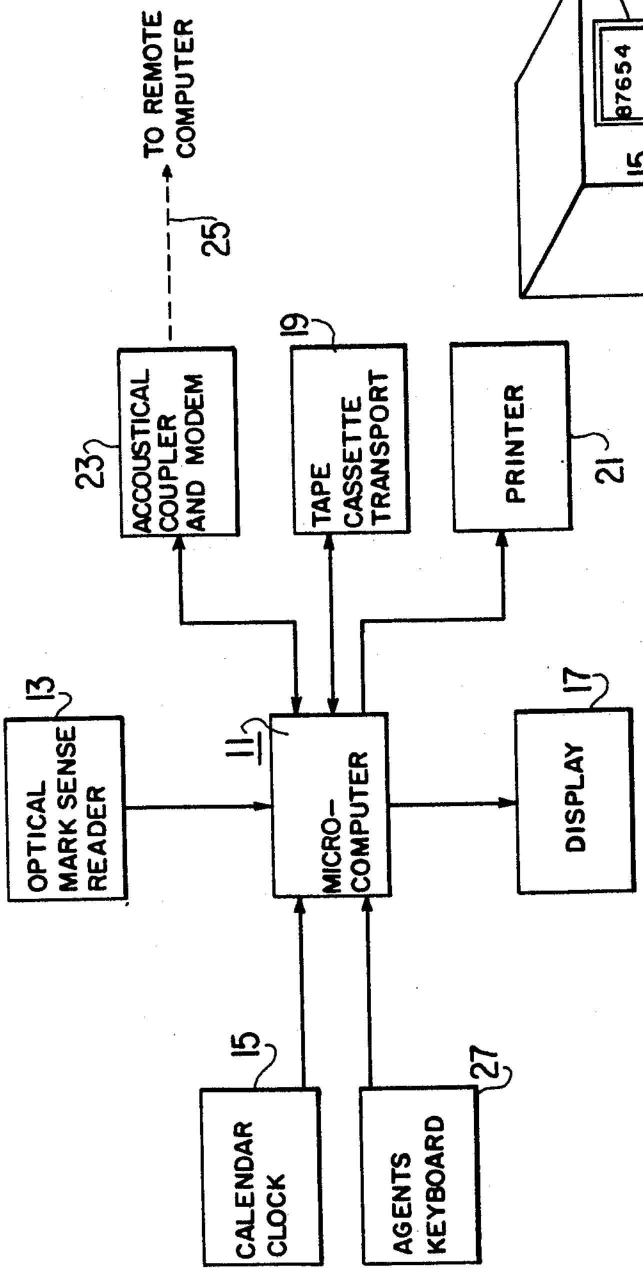
FIG. 1 is a block diagram of the basic components of the invention.

In FIG. 1 there is shown a block diagram for illustrating the principles involved in the present invention. A central processing unit (CPU) or micro-computer 11 is shown in association with several pieces of peripheral equipment. Optical mark-sense reader 13 reads the betting slips or cards and provides the information to micro-computer 11. Calendar clock 15 supplies the exact month, day, hour and minute of each transaction.

The display 17, is provided to transmit error messages and to show the amount wagered and grand totals.

The printer unit 21, provides the receipts, journal entries and grand totals.

Tape cassette transport 19, receives the betting slip information and records it sequentially in the files, with one file per slip up to 5,000 files. It is designed to read back to the micro-computer 11, for journal entries.

The acoustical coupler and modem 23, interconnects the micro-computer 11, over telephone line 25, to the remote central computer (not shown) for supplying all information thereto.

The agent's keyboard 27, is provided to permit him to exert certain controls over the process. It comprises six keys with six separate functions discussed in connection with FIG. 3.

Figure 1A:
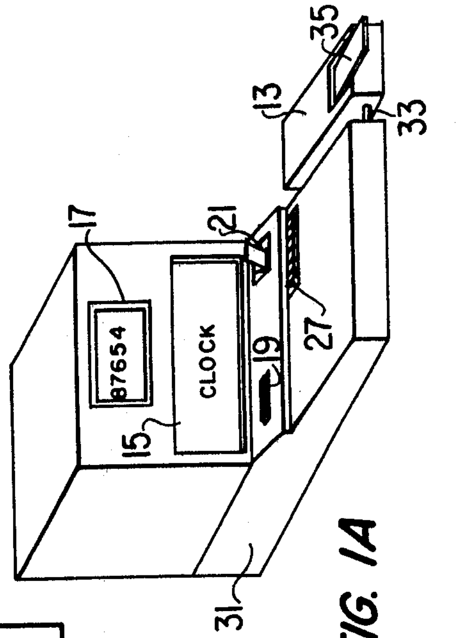
FIG. 1A is a view in perspective of the housing of the invention.

In FIG. 1A, there is shown a view in perspective of the apparatus in accordance with this invention. A housing 31, includes the electronics with the exception of the optical mark-sense reader 13, which is interconnected with housing 31, via cable 33. A ticket or betting slip 35, is shown being placed into the reader for scanning.

Housing 31, includes the six agents keys or keyboard 27, the printer 21, the calendar clock 15, and the display 17, visible from the exterior. Also a cassette 19, is shown in place for receiving or transmitting information.

Figure 2:
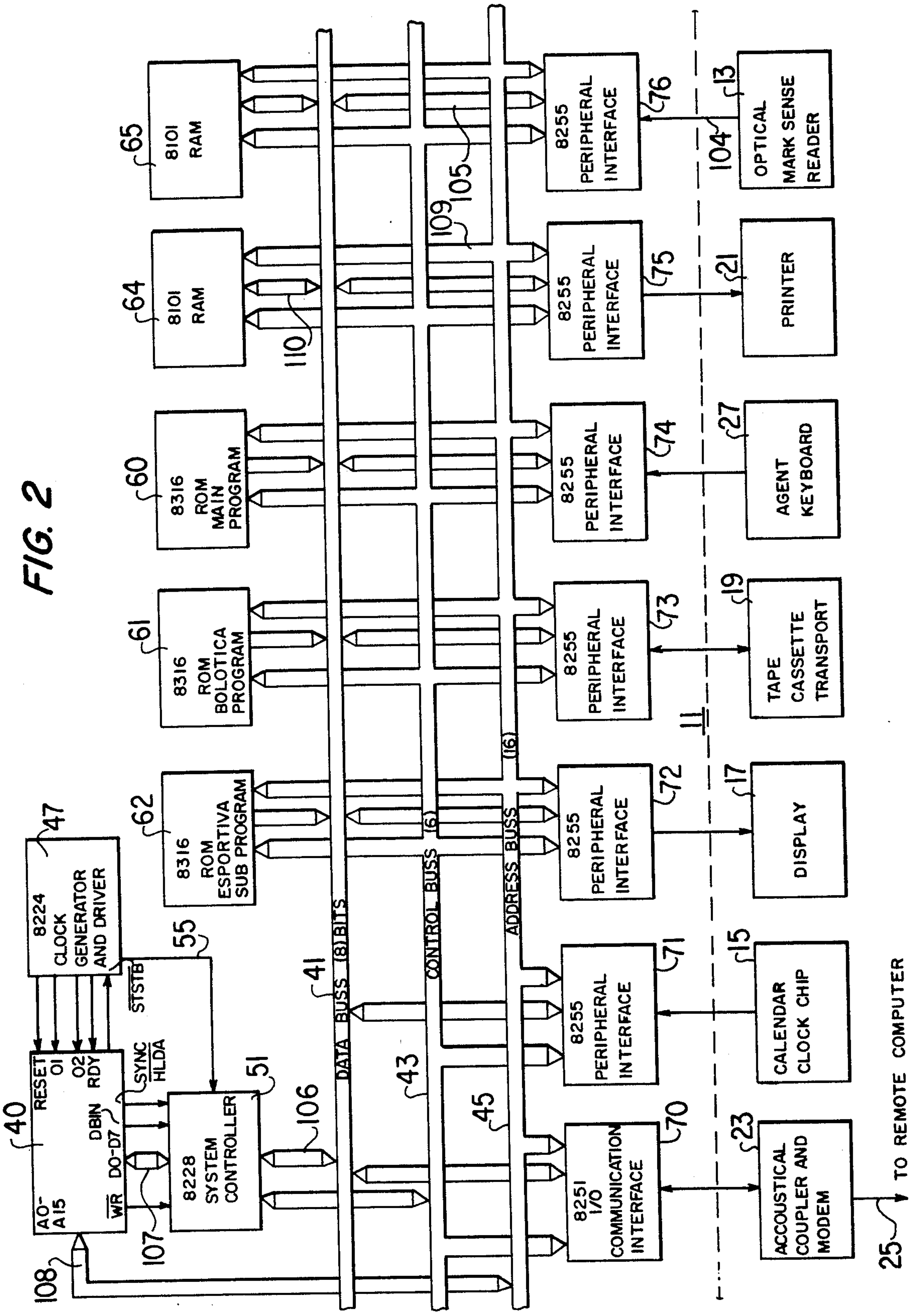
FIG. 2 is a data flow sheet showing the components of FIG. 1 interfaced with the micro-computer chips including additional memory.

In FIG. 2, the details of the micro-computer 11, are shown. It comprises all of the drawing with the exception of the peripheral units already discussed in connection with FIG. 1.

The central processing unit is shown at 40 as being a micro-processor chip of the 8080 type. The remaining components are separate chips and are connected to the CPU 40 by way of data bus 41 (8 wires i.e. 8 bits), control bus 43 (6 bits data), and address bus 45 (16 bit data).

A clock generator and driver 47, provides the clock signals to CPU 40 at inputs for reset (clear progressive counter, start at location O in memory), phase 1, phase 2 (two externally supplied clock phases), RDY (valid data available on 8080 bus), and the CPU unit 40 addresses the clock 47 over a SYNC lead.

The in-out control for CPU 40 is a system controller chip 51, of the 8228 type. The WR lead for write is used for the memory write or input-output control. The D0-D7 (8 bit) bus is for bi-directional data transfer. The DBIN is the data bus control and the HLDA is the hold acknowledge. STSTB defines status between clock 47 and controller 51.

The CPU unit receives and transfers information to the remaining chips in FIG. 2, over the A0–A15 address bus. This provides the address to memory up to 64,000 eight bit words or denotes the input-output device number for up to 256 input and 256 output devices. A0 is the least significant address bit.

The micro-computer 11 is provided with three ROM memories all 8316 chips. The first ROM memory 60, stores the main program. The second ROM memory 61, stores the program for the Boleteca game and the third ROM memory 62, stores the program for the Esportiva game. Further ROMs may be incorporated to add additional games to the present system.

Two RAM or random access memories are shown, each of 8101 type chips. One of these RAMs, for example 64, may include the matrix which is 12 by 35, and the other RAM 65, is provided for secondary data storage.

Each of the peripherals is interfaced with the microcomputer 11, over peripheral interface chips 70–76, with the later 6 chips being of type 8255 and communication interface chip 70 being type 8251.

BOLOTECA GAME

In FIG. 4, the pertinent portions of the bettor slip or card are shown to describe the principles employed. On the reverse side of the ticket, indicated by the strip 80, there are shown 35 timing marks called strobe marks 81. It is the information between these marks which is read. The data field 83, is found between identification bars 85 and 87. Bars 85 and 87 correspond to field lines 7 and 25 which identify the Boloteca game with data information therebetween.

This ticket is marked by the bettor, such that team 10 should come up first (1), team 12 second (2), team 33 third (3), and so forth in the sequence of six teams essential to pick.

This data information is read into RAM 64 (FIG. 2) under program control by micro-computer 11, using CPU 40. The capacity of this RAM exceeds 35 lines by 12 fields which covers the largest data matrix of 12 by 35. While the information in field 83, of the Boloteca slip is only 14 lines by 12 fields, other games require more data.

Figure 5:
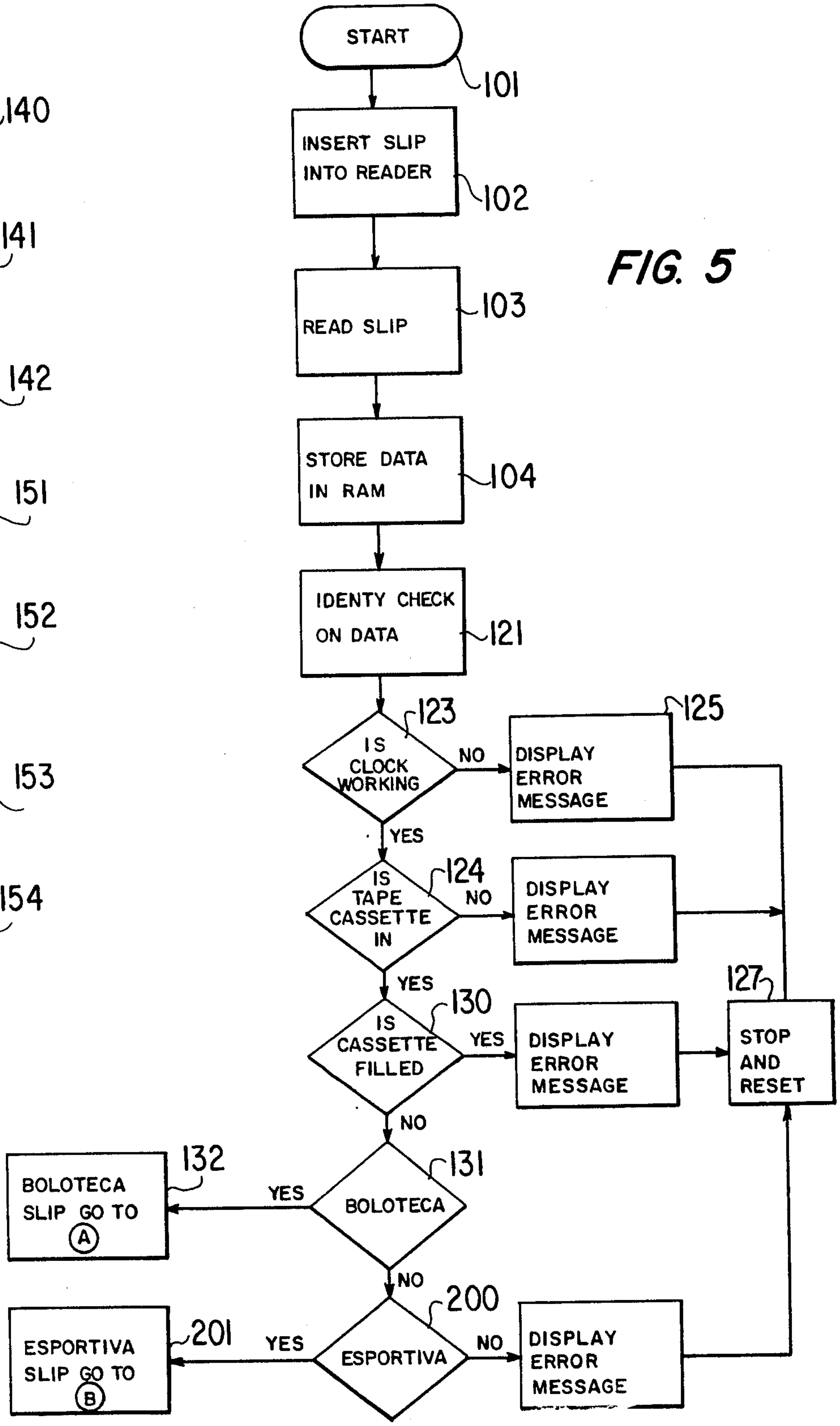
FIG. 5 shows the initial common portion of sequence of operation for the games.

Referring now, to FIG. 5, the sequence of operation for playing either of the games is shown as starting at START 101. Betting slip 35 (of either the Boloteca or Esportiva type) is inserted into reader 13 which is shown as block step 102. Microcomputer 11, under program control, reads this slip as step 103, by virtue of control over reader 13, from micro-computer 11. Data flows from optical mark-sense reader 13, through line 104 (FIG. 2) into, peripheral interphase 76. The data then flows through bus 105, into bus 41, and then on through bus 106 into systems controller 51. The data then flows through bus 107 into CPU 40. CPU 40 then addresses RAM 64 by sending a signal over address bus 108, into address bus 45, and then through address bus 109 to RAM 64. Under program control, CPU 40 directs the data originating from optical mark-sense reader 13, through data bus 107 to systems controller 51, and then through data bus 106 into data bus 41 and then to data bus 110, going to RAM 64. The data is then distributed to the 12 by 35 matrix residing within RAM 64. The identity check or step shown at 121 (FIG. 5) determines whether or not bars 85 and 87 on the Boloteca ticket (FIG. 4) appear at line 7 and line 25 and each take up 12 fields. Under program control, CPU 40 then checks at step or block 123 (FIG. 5) to determine if calendar clock chip 15 (FIG. 2) is working.

If not the program branches to the display error stop and reset routing, illustrated by blocks 125 and 127. If the answer is yes, the program proceeds to step 129 which is a decision as to whether the tape cassettes in. Here again if the answer is no, the display and reset subroutine is brought in. If yes, the next question is, is the cassette filled, step 130. If no, step 131 continues with the mainline program. At step 131 it is determined that there is bar data in line 7 and line 25 so that the game of Boloteca is recognized and the program branches to the Boloteca program 132 contained in ROM 61.

Beginning with FIG. 6, now Boloteca step 133 determines if six bets have been made, by checking for data in rows one through six of field 83 (FIG. 4). If no, the error message is displayed at box 134 and the error and stop and reset subroutine brought into play, including step or box 135.

The error messages are as follows:

1. improper bets
2. less than the required number of bets made
3. bets made over set cash limit
4. invalid slip form
5. bets made under set cash limit
6. calendar/clock not working
7. tape cassette not in transport
8. tape full, change cassette
9. wrong tape format In the present situation, as a result of error message number 2 a display is made at 134. If all six bets have been made the program proceeds to display price at step or block 135. For the Boloteca game, only 10 cruseros is displayed.

Figure 3:
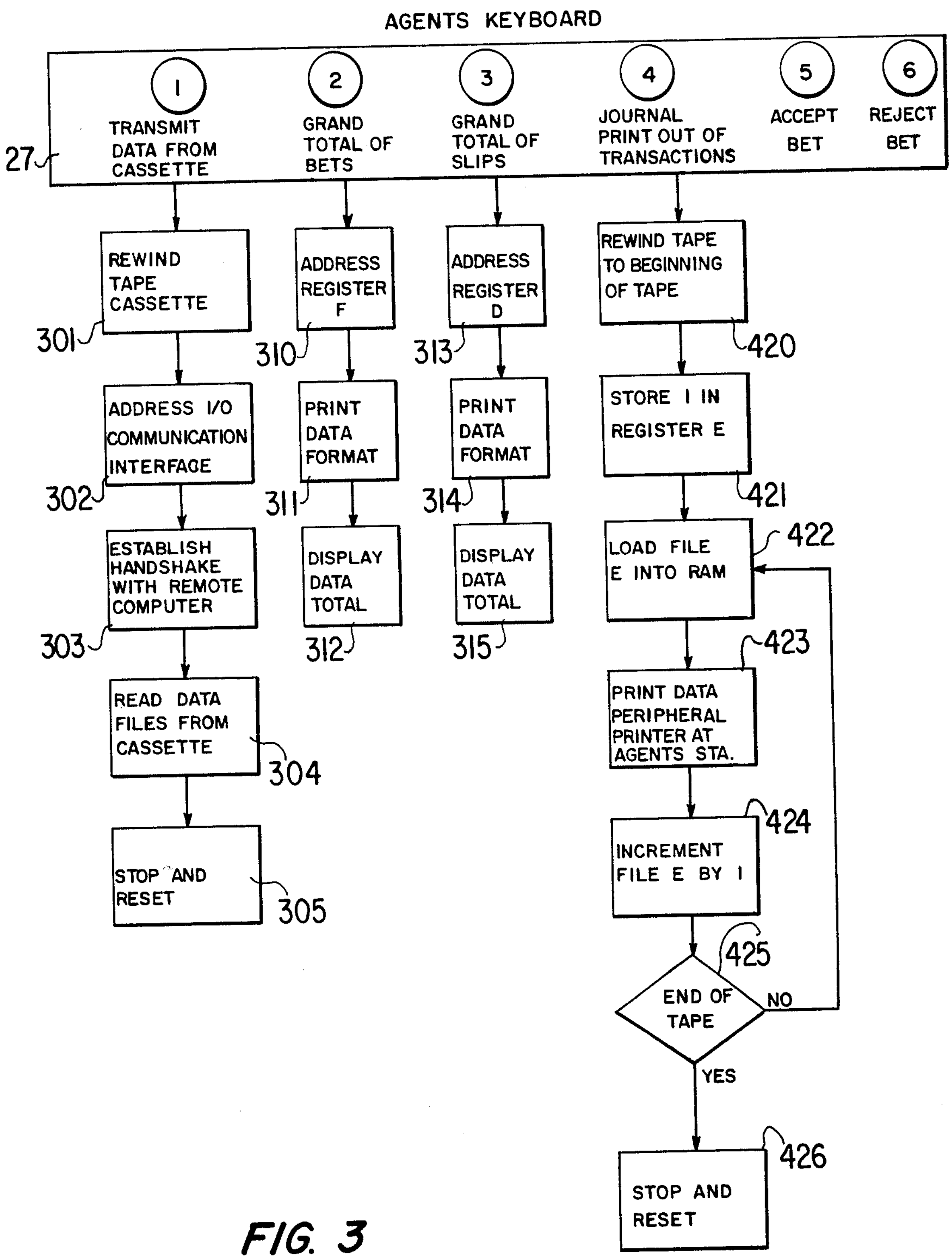
FIG. 3 shows the agents keyboard with process steps for use of the keys.

Step 136 is for the agent to press his push button number 5 of FIG. 3, which accepts the bet. Alternatively, he may press his reject key 6, shown by block 137, which would then reset the machine.

Figure 7:
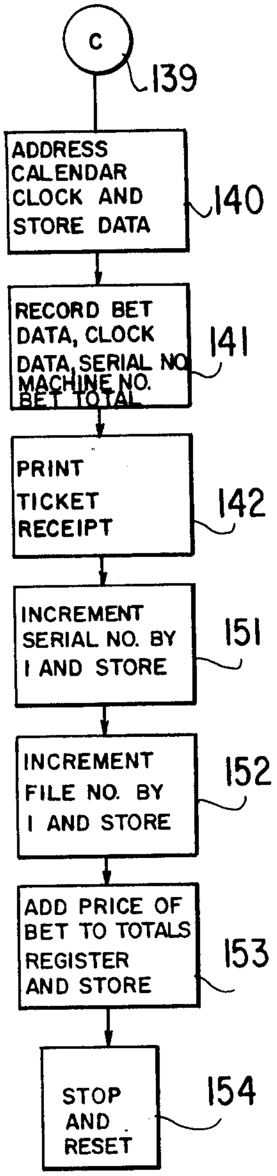
FIG. 7 shows the terminating portion of the sequence for both games.

If the bet is acceptable, the Boloteca format is loaded in the RAM 65 from ROM 61 under control of CPU 40. At step 138 this branches the program back to the main sequence of FIG. 7, shown at C by step 139. Calendar clock 15, is addressed and its data stored at step 140. Step 141 records the betting data, clock data, serial no., machine no., and total amount of bet on tape cassette 19. At step 142, printer 21 prints the ticket receipt. This information is shown in FIG. 8. The identification of the game is printed at 143. The playing period information appears at 144. The bet data appears under classification as place 1 team 10, place 2 team 12, etc. The amount of the bet appears at 145, serial no. at 146, date and time at 147 and tape cassette file where the data is recorded at 149.

Returning to FIG. 7, the step 151 increments internal registers of CPU 40 by 1. Step 151 increments at register C, the serial no., and step 152 increments register D for the file no., and step no. 153 increments the tool amount of the bet at register F. Step 154 is the automatic stopping and resetting of microcomputer 11.

ESPORTIVA GAME

The pertinent portions of the Esportiva ticket are shown in FIG. 9 with identification bar 150 being placed at line 20. The bettor must select the outcome of 13 games which are being held during a 1 week period. The bettor may select either team one to win, team two to win or a tie between the two teams as a standard bet. In addition, he may select double or triples for any particular game up to a certain crusero total. The rules of this game require that the bettor make a minimum of 12 single bets and one double bet for a minimum price of three cruseros. Additional double and triple bets can be made up to a maximum of 162 cruseros. This game is layed out on a 12 by 35 matrix form.

Returning now to FIG. 5, the sequence of operation is shown beginning with start 101 and traversing the same steps already explained until identifying bar 150 (FIG. 9) is sensed in the proper position to identify the Esportiva game at step 200 (FIG. 5). The program then branches to Esportiva program 201, in ROM 62 (FIG. 2).

This is illustrated in FIG. 10 wherein the first decision shown at step 203 is have 13 bets been made. In this game if the bets are proper, then step 204 calculates the bet price for all bets for that particular ticket. At step 205 if it is under the limit, it displays a message via 206 and stops and resets at 207. If over the limit, the same is true via step 209, under control of decision 210. If everything is proper, the total price is displayed at 211. Next, the agent then receives the cash at step 212 and he presses his accept key (FIG. 3) at step 213. Step 214 loads the Esportiva format from ROM 62 to RAM 65. The program is then branched back at step 215 from FIG. 10 to FIG. 7, to the main program shown as starting at 139. The main program is followed, as before, through step 154 stop and reset.

The main program of FIG. 7 includes step 142 which is printing the ticket receipt. The receipt for the Esportiva game is illustrated in FIG. 11. At 270 there is shown the identification and ending week for the game. Number 271 indicates the selections as marked on the original ticket. Number 272 shows the amount calculated for the wager on this particular ticket. The serial no. is shown at 273, the game week sequential identification no. is shown at 274, time and date information at 275, and file no. at 276.

Returning now to FIG. 3, the remaining functions of the agents keyboard 27 will be described. The transmit key 1, causes all tape cassette data to be transmitted from cassette 19, under program control of CPU 40, to communicate interface 70 (FIG. 2), and via acoustical coupler and modem 23, to remote telephone line 25, extending to the remote computer. Step 301 rewound the tape, step 302 controls the addressing of the communication interface, step 303 establishes handshake with the remote computer, step 304 reads the data of files from the cassette, and step 305 stops and resets the micro-computer.

The grand total of bets (agents key no. 2), at step 310, addresses register F of CPU 40 to print the grand total of bets at step 311, and displays this total at step 312.

Key no. 3 merely controls the grand total of the no. of bets or betting slips to that time. When it is depressed, at step 313, register D of CPU 40 is addressed to print this no. at step 314 and display the data at step 315.

Figure 13:
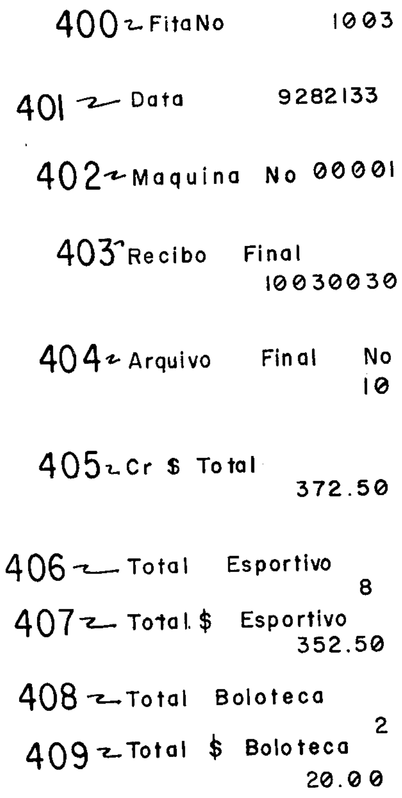
FIG. 13 shows a print out of grand totals.

As a result of operation of agents keys 2 and 3, the information available is shown printed out at FIG. 13. Tape cassette no. is shown at 400, clock information at 401, machine no. at 402, serial no. of the last ticket at 403, and the final number of tickets sold to the time of depressing the key at 404.

At 405, the total amount of the bets at the time of depressing the key is shown. The total Esportiva betting slips is shown at 406, the total amount bet on the Esportiva games at 407, the total number of Boloteca bets at 408, and the total Boloteca money wagered at 409.

Figure 12:
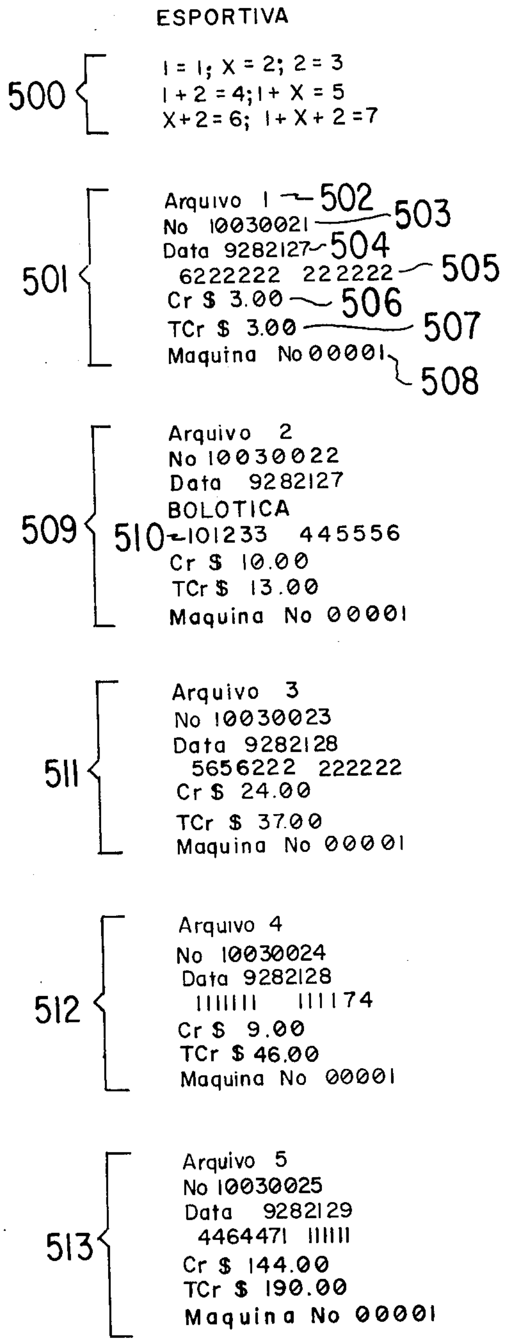
FIG. 12 illustrates a journal print out of transactions.

Reference is now made to FIG. 3, agents keyboard button no. 4, Journal Printout of Transactions. The agent may select at any time, to have the entire printout of all files within the tape cassette. Depressing key 4, selects a subprogram in program ROM 60 and causes the tape cassette to rewind to the beginning of tape status, as shown in block 420. CPU 40, under program control, stores the number 1 in register E, as shown in block 421. File E within tape cassette transport 19, is then loaded into RAM 65, as shown in block 422. All data in file E is printed on a journal tape, through printer 21. As shown in FIG. 12, block 424 (FIG. 3) causes file E to be incremented by 1, thereby advancing register E to the next number. Decision 425 checks for end of tape status. If the tape is not at its end, the program branches back to block 422, to load the next file and the same sequence is repeated again until the end of the tape has been reached, whereupon the stop and reset function, as noted in block 426, takes place.

FIG. 12 shows a journal printout for five separate transactions. Header 500 explains the code for bets in the Esportiva game. The number 1 denotes that team one was bet, 2 shows that the $x$ or tie was bet, 3 notes that team two was bet, 4 notes that teams one and two were played for double, 5 denotes that teams one and a tie were bet for a double, 6 denotes that teams two and a tie were bet for a double, 7 denotes that all three positions, team one, a tie and team two were selected for a triple.

Number 501 shows one transaction printout. Number 502 shows the file number on the tape cassette, 503 shows the serial no. of the ticket, 504 shows the date and time of the transaction, 505 notes the type of bet which was made in each one of the 13 games, as noted above, 506 lists the total amount of the bets, 507 lists the total amount accumulated in the grand total register F, and 508 lists the machine identification no.

Number 509 shows the transaction for a Boloteca bet. All information is the same as contained in the Esportiva file with the exception that the word Boloteca appears in the file and that six sets of two numbers each are shown at 510 identifying the bets made from the six games of the original ticket.

Numbers 511, 512 and 513 show successive printouts of transactions of the tape cassette.

For these games, in CPU 40, the following memory allocation is made. Register C-serial no. of transaction, Register D-no. of transactions and tape file no., Register E-journal printout counter, Register F-total of bets made, Register H-total no. of Esportiva bets, Register L-total no. of Boloteca bets and Register W-total amount of Esportiva.

By using the principles herein taught, other games may be programmed into CPU 40 and similarly tabulated.

The system is low power and an auxiliary re-chargeable storage battery power supply backs it up.

What is claimed is:

1. Apparatus for accepting, validating and recording betting information on slips filled out by the bettor for any one of a plurality of games, comprising in combination:

(a) a micro-computer means having program storage means for a plurality of games, (b) said betting slip having means to select one only of said plurality of games and initiating the program of the selected games in said micro-computer means, (c) optical reader means for transferring the betting information from said slips into memory storage under control of the micro-computer means, (d) printer means under control of said micro-computer means, (e) calendar clock means for supplying time information of each bet, (f) tape cassette transport means for recording slip and time information, (g) display means, (h) agents keyboard means for initiating printout of the information on the tape means in selective manner via the micro-computer means for checking the correctness of the slip, causing rejection of improperly filled out slip, displaying reason for rejection, dislaying amount due from customer and for accepting or rejecting the betting slip.

2. The apparatus of claim 1 wherein the micro-computer means comprises:

a central processing unit;

in-out system control means;

a plurality of ROM and RAM memories;

interface means for all means associated with the micro-computer means; and, transfer buses interconnecting all means and memories via said central processing unit.

3. The apparatus of claim 2 wherein:

the matrix storage capacity of at least one of said RAM's exceeds the matrix data capacity of each betting slip, whereby said one RAM receives and stores each slip betting data.

4. The apparatus of claim 3 wherein:

the ROM memories store the betting game formats, and the selected game format is determined by said reader means reading indicia on said slips for comparison to predetermined stored data whereby the central processing unit selects from the appropriate ROM the game format for said selected game.

5. The apparatus of claim 2 wherein:

at least one of said ROM's contains game format unique to Boloteca;

at least another of said ROM's contains game format unique to Esportiva; and, at least a further of said ROM's contains game format common to Boloteca and Esportiva.

6. The apparatus of claim 5 wherein:

said further of said ROM's contains the indicia unique to each of said Boloteca and Esportiva games; and, said central processing unit diverts the common game format by shifting from said further ROM to said one or said another ROM for the selected game format.

7. The method for accepting, validating and recording betting information on slips filled out by the bettor for any one of a plurality of games comprising:

(a) storing a program for a plurality of games in a micro-computer, (b) initiating the program of a selected game stored in the computer by said betting slip which selects only one of said plurality of games, (c) transferring the betting information from the slips optically into memory means under control of the micro-computer, (d) betting slip printing under control of said micro-computer, (e) supplying time information for each bet from a calander clock, (f) recording betting slip and time information on a tape cassette transport, and (g) initiating printout of the information on the tape in selective manner through said computer for checking the correctness of the slip, causing rejection of an improperly filled out slip, displaying the reason for rejection and displaying the amount due from the customer and for accepting or rejecting the betting slip.

8. The method of claim 7 wherein the micro-computer is capable of performing the following steps:

processing information;

directing information for each step;

providing ROM and RAM memory capacities; and, interfacing all functions associated with the micro-computer.

9. The method of claim 8 comprising the step of:

providing a matrix storage capacity of at least one of said RAM's which exceeds the matrix data capacity of each betting slip, whereby said one RAM receives and stores each slip betting data.

10. The method of claim 9 comprising the steps of:

using the ROM memories to store the betting game formats; and, determining the selected game format by said reader means reading indicia on said slips for comparison to predetermined stored data whereby the central processing unit selects from the appropriate ROM the game format for said selected game.

11. The method of claim 10 comprising the step of:

providing selection of transmitting data from the tape to the remote computer, printing totals of bets, slips and journal printout of transactions.

12. The method of claim 11 comprising the further steps of:

loading at least one of said ROM's with a game format unique to Boloteca;

loading at least another of said ROM's with a game format unique to Esportiva; and, loading at least a further of said ROM's with game format common to Boloteca and Esportiva.

13. The method of claim 12 comprising the further steps of:

establishing in said further of said ROM's the indicia unique to each of said Boloteca and Esportiva games; and, diverting the common game format by shifting from said further ROM to said one or said another ROM for the selected game format.

* * * * *